No. 664,836. Patented Jan. 1, 1901.
G. R. DAVIDSON.
GRAIN SCOURER AND SEPARATOR, SCALPER, AND BOLTER.
(Application filed May 16, 1900.)
(No Model.) 2 Sheets—Sheet 1.
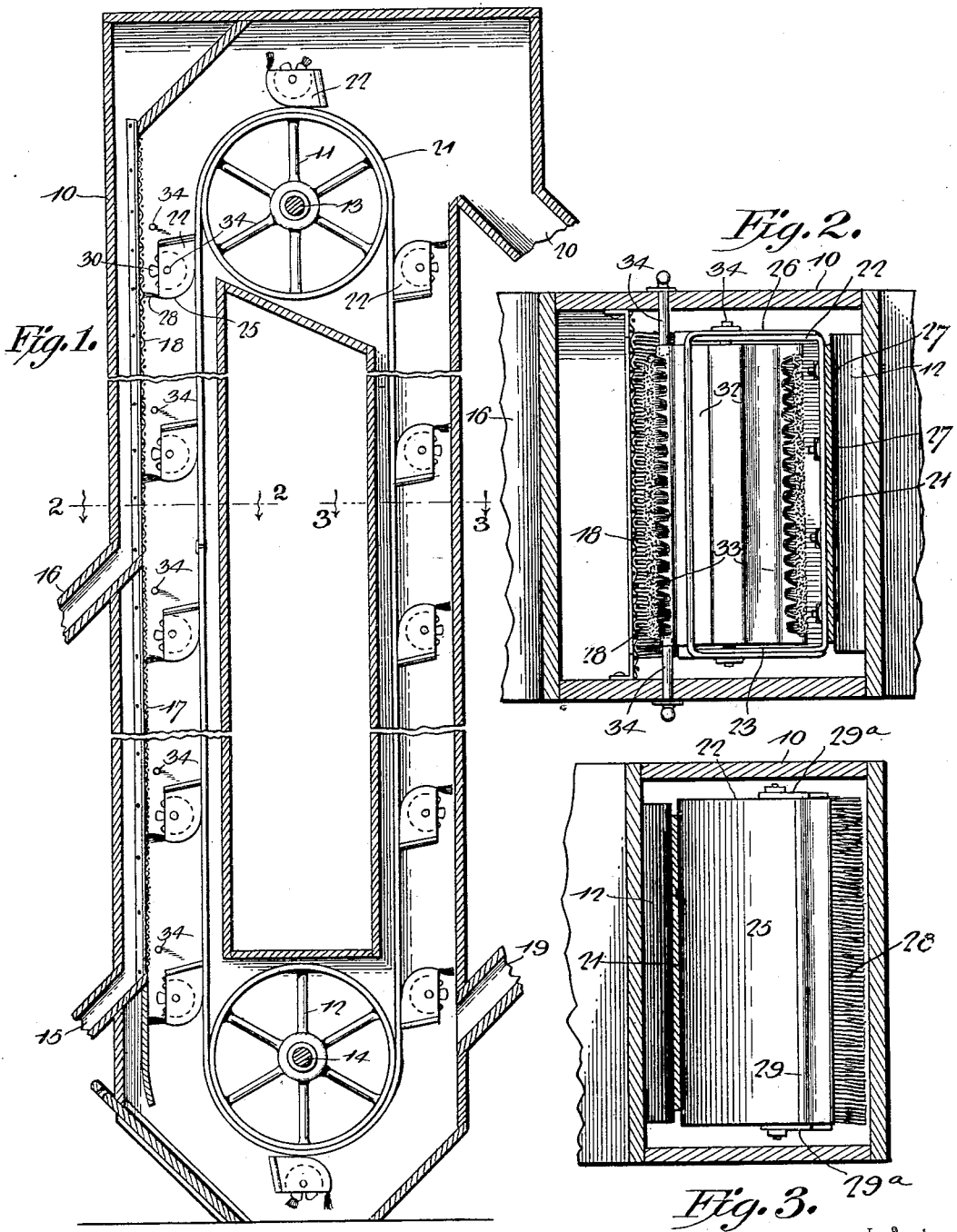

No. 664,836. Patented Jan. 1, 1901.
G. R. DAVIDSON.
GRAIN SCOURER AND SEPARATOR, SCALPER, AND BOLTER.
(Application filed May 16, 1900.)
(No Model.) 2 Sheets—Sheet 2.
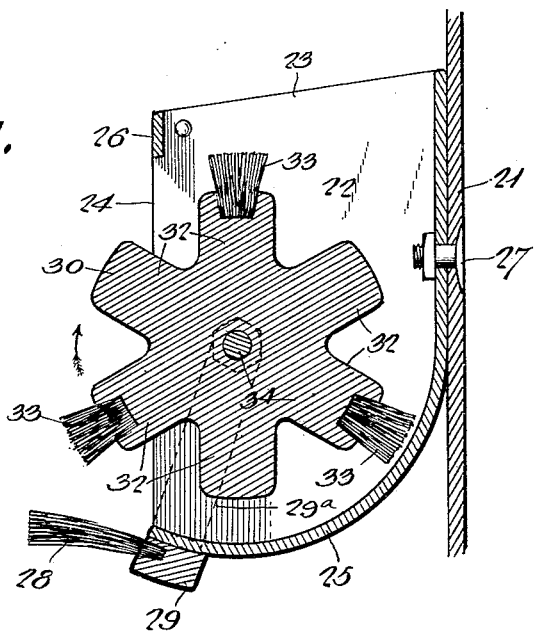
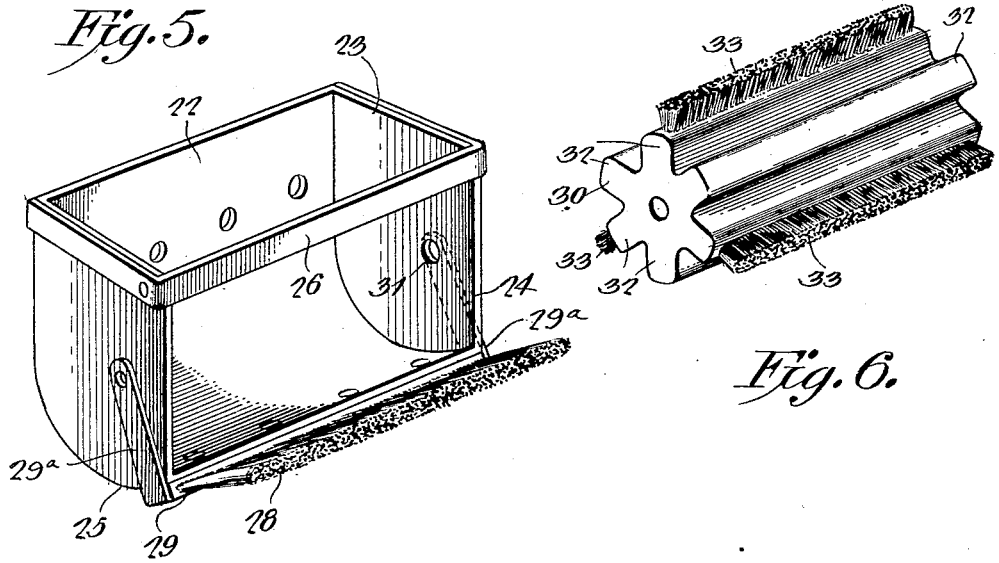

United States Patent Office.

GEORGE R. DAVIDSON, OF LENOX, MICHIGAN.

GRAIN SCOURER AND SEPARATOR, SCALPER, AND BOLTER.

SPECIFICATION forming part of Letters Patent No. 664,836, dated January 1, 1901.

Application filed May 16, 1900. Serial No. 16,903. (No model.)

*To all whom it may concern:*

Be it known that I, GEORGE R. DAVIDSON, a citizen of the United States, residing at Lenox, in the county of Macomb and State of Michigan, have invented a new and useful Grain Scourer and Separator, Scalper, and Bolter, of which the following is a specification.

My invention is an improved grain scourer and separator, the object of my invention being to provide an apparatus embodying novel constructions and combinations of devices, which is efficient in scalping, grading, and bolting grain and millstuff, is automatic in its operation, and requires little or no attention.

The invention consists in the peculiar construction and combination of devices hereinafter fully set forth, and pointed out in the claims.

In the accompanying drawings, Figure 1 is a vertical sectional view of a grain scourer and separator embodying my improvements. Fig. 2 is a detail transverse sectional view of the same, taken on the line 2 2 of Fig. 1. Fig. 3 is a similar view taken on the line 3 3 of Fig. 1. Fig. 4 is a detail sectional view of one of the elevating-cups and the revoluble brush therein. Fig. 5 is a detail perspective view of one of the elevating-cups with the revoluble brush removed therefrom. Fig. 6 is a detail perspective view of one of the revoluble brushes.

In the upper and lower ends of an elevator-case 10, which is of suitable construction, are mounted pulleys 11 12 on shafts 13 14, respectively. The elevator-case is provided on its outer side with downwardly-inclined discharge-spouts 15 16, the spout 15 being near the bottom of the elevator-case and the spout 16 being about midway between the top and bottom thereof. A fine cloth or screen 17 extends from the bottom of the spout 15 to the bottom of the spout 16, is arranged at a suitable distance within the outer side of the elevator-case 10, and is so disposed that material which passes through the said cloth or screen falls therefrom onto the spout 15 and is discharged through the said spout. A coarse screen 18, which is in line with the screen 17, extends from the upper spout 16 for a suitable distance toward the upper end of the elevator-case, and said screen 18 is so disposed with relation to the said spout 15 that material which passes through said screen 18 falls therefrom onto the spout 16 and is discharged through the latter. The said elevator-case on its inner side is provided near its lower end with an inlet or feed chute 19 and at its upper portion, at a suitable point, with a discharge spout or flue 20. Power is communicated to the pulleys 11 12 through the shafts 13 and 14 in any suitable manner. An endless traveling elevator-belt 21 connects the pulleys 11 12 and is made of suitable material, usually of leather or the like, and said belt is of a width nearly coextensive with that of the elevator-case. A series of elevator-buckets 22 are secured to the outer sides of the endless traveling elevator-belt at suitable regular distances apart. Each of the said buckets is open, as at 23, on the side in the direction of the motion of the belt and the outer side of said bucket is open, as at 24, the bottom of the bucket being curved, as at 25, and forming the segment of a circle.

The buckets 22 are made of suitable sheet or plate metal. The ends of the buckets at the open outer sides thereof are reinforced by a band or strip 26, the same also serving to connect the ends of the bucket together, as shown, and thereby strengthening the ends of the bucket. The buckets may be attached to the endless traveling elevator-belt in any suitable manner, but I usually so attach the said buckets by means of rivets or bolts, as at 27, the said rivets or bolts in each bucket being disposed in line with each other to admit of the curvature of the belt as the same passes the pulley. Each bucket is provided at the outer side of the curved bottom thereof with a brush 28, made of suitable material, the bristles of the brush being secured in a head 29, which is secured to the bucket by straps 29$^a$ at the ends thereof, and is adjustable to compensate for wear of the brushes. It will be observed by reference to the drawings that the bruhes 28 projects from the outer sides of the buckets and bear against the screens 17 18 during the ascent of the buckets in the outer sides of the elevator-case.

In each bucket is disposed a revoluble agitator and brush 30, the same being journaled in bearings in the ends of the bucket, as at 31, and being provided with a series of radial ribs or members 32. It will be observed that the said revoluble brushes and agitators are concentrically disposed with reference to the curved sides of the buckets, and it will be further observed that certain of the ribs or members 32 are provided with brushes 33, which in rotation coact with the curved sides 25 of the buckets.

Any suitable means may be employed for journaling the revoluble brushes and agitators in the buckets. In the form of my invention here shown I employ bolt-rods 34 for this purpose, the same extending through the ends of the buckets and longitudinally through the centers of the revoluble agitators and brushes. That side of the elevator-case which is provided with the screens 17 18 is further provided with a series of tappets 34, which are disposed in the path of the revoluble brushes and agitators, and are adapted by contact with the latter as the same ascend to rotate said brushes and agitators in said buckets, each of said tappets imparting a partial rotation to each of said brushes and agitators as the same passes said tappet, as will be readily understood, the brushes and agitators being caused to move in the direction indicated by the arrow in Fig. 4.

The operation of my invention is as follows: The material which is supplied to the lower end of the elevator-case is taken by the buckets successively up the outer side of the elevator-case and as the same by gravity descends in the buckets it passes between the screens and the brushes 28, said brushes and screens coacting to remove foreign substances from the grain, if the material being treated is grain, and the finer particles being forced through the fine cloth or screen 17. The coaction of the revoluble agitators and brushes and the buckets is such that the material in the buckets is kept in motion during the ascent of the buckets, the attrition of the buckets 33 and the curved sides of the buckets serving to scour the material and the radial ribs or members 32 serving to feed the material onto the brushes 28, as will be readily understood. Such material as drops from each bucket and fails to pass through either of the screens is caught by the next subjacent bucket in the series, and hence the material is constantly stirred, rubbed, and screened during its ascent in the elevator. The coarser particles escape through the spout 16 after being forced through the screen 18, and such of the material as fails to pass through either of the screens is discharged by the buckets successively as they pass over the upper pulley 11 through the chute or flue 20.

It will be understood that by using appropriate screens my improved scourer and separator may be employed for cleaning and separating grain and for scalping and bolting purposes.

Having thus described my invention, I claim—

1. In a machine of the class described, the combination of a screen, an endless traveling element having buckets, said screen and said buckets coacting, revoluble feed elements in said buckets, and means to revolve said revoluble feed elements, substantially as described.

2. In a machine of the class described, the combination with a screen, of an endless traveling element having buckets provided with brushes coacting with said screen, agitators in said buckets and means to actuate the same, substantially as described.

3. In a machine of the class described, the combination with a screen (one or more) of an endless traveling element having buckets provided with brushes adapted to coact with the screen, and revoluble agitators and brushes on said buckets, for the purpose set forth, substantially as described.

4. In a machine of the class described, in combination with a screen (one or more) an endless traveling element having buckets provided with curved surfaces and brushes, the latter adapted to coact with the screen, revoluble members in said buckets, having radially-disposed ribs and brushes, the latter coacting with the curved surfaces of the buckets, and means to actuate said revoluble members during the ascent of the buckets, substantially as described.

5. The combination with the elevator-casing having a screen in one side, of an endless traveling element in said casing, having elevating-buckets, and revoluble agitators in said buckets, and tappets in the path of said agitators to rotate the same, substantially as described.

In testimony that I claim the foregoing as my own I have hereto affixed my signature in the presence of two witnesses.

GEORGE R. DAVIDSON.

Witnesses:
ARTHUR H. HUNVICK,
CLARENCE G. JOHNS.